(12) United States Patent
Liebert

(10) Patent No.: US 11,878,676 B2
(45) Date of Patent: Jan. 23, 2024

(54) MOTOR VEHICLE COMPRISING AT LEAST TWO DRIVE MOTORS AND COMPRISING AN AUTOMATIC GEARBOX HAVING A FIXED GEAR RATIO AND A POWER-SPLIT GEAR RATIO

(71) Applicant: Bayerische Motoren Werke Aktiengesellschaft, Munich (DE)

(72) Inventor: Sebastian Liebert, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/017,754

(22) PCT Filed: Aug. 20, 2021

(86) PCT No.: PCT/EP2021/073098
§ 371 (c)(1),
(2) Date: Jan. 24, 2023

(87) PCT Pub. No.: WO2022/058122
PCT Pub. Date: Mar. 24, 2022

(65) Prior Publication Data
US 2023/0294664 A1   Sep. 21, 2023

(30) Foreign Application Priority Data
Sep. 18, 2020 (DE) .................... 10 2020 124 339.1

(51) Int. Cl.
*B60W 30/19* (2012.01)
*B60W 20/30* (2016.01)
(Continued)

(52) U.S. Cl.
CPC ............ *B60W 20/30* (2013.01); *B60K 6/365* (2013.01); *B60K 6/543* (2013.01); *B60W 10/06* (2013.01);
(Continued)

(58) Field of Classification Search
CPC ........ B60W 30/19; B60W 2710/0666; B60W 2710/083; B60W 10/06; B60W 10/08;
(Continued)

(56) References Cited

U.S. PATENT DOCUMENTS 9,963,151 B2    5/2018  Nilsson et al.
2013/0150207 A1 6/2013  Kobayashi et al.
(Continued)

FOREIGN PATENT DOCUMENTS

DE       102009000254 A1 *  7/2010 ......... F16H 61/0403
DE    10 2011 086 143 A1    5/2013
(Continued)

OTHER PUBLICATIONS

International Search Report (PCT/ISA/210) issued in PCT Application No. PCT/EP2021/073098 dated Nov. 5, 2021 with English translation (four (4) pages).
(Continued)

*Primary Examiner* — Sherry L Estremsky
(74) *Attorney, Agent, or Firm* — Crowell & Moring LLP

(57) ABSTRACT

A motor vehicle includes at least two drive motors, an automatic gearbox, and an electronic control unit, which, during a gear ratio adjustment between an engagement and a loading of a shift element, causes the shift element to be loaded with a predefined torque gradient at a first point in time at which at least one tooth-to-tooth position exists, up to a second point in time, cause the predefined torque to be limited to a maximum permissible torque during a predefined waiting period from the second point in time up to a third point in time, and cause the shift element to be further loaded with the previously predefined torque gradient after the waiting period or when the engaged state is detected.

20 Claims, 14 Drawing Sheets

(51) Int. Cl.
*B60W 10/08* (2006.01)
*F16H 61/04* (2006.01)
*F16H 61/66* (2006.01)
*B60W 10/101* (2012.01)
*F16H 37/04* (2006.01)
*B60K 6/543* (2007.10)
*B60K 6/365* (2007.10)
*B60W 10/06* (2006.01)

(52) U.S. Cl.
CPC .......... *B60W 10/08* (2013.01); *B60W 10/101* (2013.01); *B60W 30/19* (2013.01); *F16H 37/04* (2013.01); *F16H 61/0403* (2013.01); *F16H 61/66* (2013.01); B60W 2510/0657 (2013.01); B60W 2510/083 (2013.01); B60W 2510/105 (2013.01); B60W 2510/1005 (2013.01); B60W 2710/0666 (2013.01); B60W 2710/083 (2013.01); B60W 2710/1005 (2013.01); B60W 2710/1022 (2013.01); B60Y 2200/92 (2013.01); F16H 2061/0422 (2013.01); F16H 2061/6603 (2013.01); F16H 2200/2005 (2013.01); F16H 2200/2094 (2013.01)

(58) Field of Classification Search
CPC .............. B60W 10/101; F16H 61/0403; F16H 2061/0422; F16H 2061/6603; F16H 2200/2005; F16H 2200/2094; B60K 6/543
See application file for complete search history.

(56) References Cited

U.S. PATENT DOCUMENTS

2013/0151094 A1 6/2013 Steinhauser et al.
2015/0127231 A1 5/2015 Maurer et al.
2020/0217399 A1 7/2020 Kluge et al.

FOREIGN PATENT DOCUMENTS

| DE | 10 2011 087 858 A1 | | 6/2013 | | |
|---|---|---|---|---|---|
| DE | 10 2013 222 381 A1 | | 5/2015 | | |
| DE | 102015219340 A1 | * | 4/2017 | ............. | B60K 6/387 |
| DE | 10 2017 200 786 A1 | | 7/2018 | | |
| DE | 10 2017 217 133 A1 | | 3/2019 | | |
| EP | 1826441 A1 | * | 8/2007 | ............ | B60W 10/02 |
| EP | 2249062 A1 | * | 11/2010 | ........... | F16H 37/046 |

OTHER PUBLICATIONS

German-language Written Opinion (PCT/ISA/237) issued in PCT Application No. PCT/EP2021/073098 dated Nov. 5, 2021 (eight (8) pages).
German-language Search Report issued in German Application No. 10 2020 124 339.1 dated Feb. 9, 2021 with partial English translation (11 pages).

* cited by examiner

MOTOR VEHICLE COMPRISING AT LEAST TWO DRIVE MOTORS AND COMPRISING AN AUTOMATIC GEARBOX HAVING A FIXED GEAR RATIO AND A POWER-SPLIT GEAR RATIO

BACKGROUND AND SUMMARY

The invention relates to a motor vehicle comprising at least two drive motors, wherein at least one drive motor is an electric machine, comprising a high-voltage battery, comprising an automatic gearbox which has at least one fixed gear ratio and at least one power-split gear ratio for gear ratio adjustment or a serial gear ratio starting from the at least one fixed gear ratio, and comprising an electronic control unit.

Automatic gearboxes for motor vehicles are known. Automatic gearboxes for hybrid electric vehicles are also known, which in addition to an internal combustion engine also have at least one electric motor for the drive. Current automatic gearboxes for hybrid electric vehicles (hybrid gearboxes) are usually based on existing automatic gearboxes. The electric machine for electrification is usually positioned between the internal combustion engine and the gearbox (so-called P2 hybrid). However, this type of hybridization does not bring any advantages for the gearbox per se.

Gearboxes suitable for hybridization are, for example, powershiftable automatic gearboxes that provide the various fixed gear ratios via frictionally engaging shift elements. In these gearboxes, at least one shift element is operated under slip during gear changes. The friction work during slip operation is converted here into heat, which must be dissipated by the frictionally engaging shift elements via a sufficient cooling oil flow. Furthermore, the frictionally engaging shift elements generate corresponding drag losses in the open state. The shift elements are usually controlled hydraulically. To enable them to transmit power in the closed state, the friction plates of the shift elements must be permanently pressed against each other with a correspondingly high hydraulic pressure. The hydraulic pump required for this is used both for cooling and for actuating the shift elements. However, it requires a certain amount of power to operate, which reduces the overall efficiency.

According to the subject matter of DE 10 2017 217 133 A1, an automatic gearbox comprising an internal combustion engine, comprising at least two fixed gearbox ratios, comprising three gearbox shafts, comprising an epicyclic gearing, comprising two shift elements and comprising a variator is provided. In this case, a first side of the variator can be coupled to a first gearbox shaft in a torque-transmitting manner and a second side of the variator can be coupled to the epicyclic gearing via a second gearbox shaft in a ratio-adjusting manner. This means that the second side of the variator is in a 3-shaft operation together with the internal combustion engine and an output of the automatic gearbox, whereby the second side of the variator has a ratio-adjusting effect on the internal combustion engine via the epicyclic gearing. The variator here allows a continuous ratio adjustment. Thus, further ratios can be set independently of the fixed gear ratios, in particular any intermediate states between the fixed gear ratios. Preferably, the variator is formed by two electric machines. In this case, one of the electric machines is operated as a generator and the other electric machine as a motor. By temporarily converting mechanical energy into electrical energy, the speeds of the two electric machines can be decoupled, thus providing variator functionality with the two electric machines. The epicyclic gearing can be a planetary gearing.

In the case of the serial gear ratio, there is no mechanical coupling of the internal combustion engine to the driving axle of the vehicle; the drive power of the internal combustion engine is converted 100% into electrical power by a first electric machine and back into mechanical drive power at the driving axle by a second electric machine. In contrast to the power-split gear ratio, the variator in the serial gear ratio thus transmits the full drive power. Since the change from the serial gear ratio and the power-split gear ratio to a fixed gear ratio are comparable within the scope of the invention, the content of the invention is described below with respect to the power-split gear ratio, but applies equally to the serial gear ratio.

One object of the invention is to improve a hybrid motor vehicle comprising an automatic gearbox of the type described at the outset in respect of its gear ratio adjustment.

This object is achieved by the features disclosed herein. Advantageous developments are also disclosed herein.

The invention relates to a motor vehicle comprising at least two drive motors, wherein at least one drive motor is an electric machine, comprising a high-voltage battery, comprising an automatic gearbox which has at least one fixed gear ratio (fixed gear) and at least one power-split gear ratio (E-CVT) and/or a serial gear ratio for gear ratio adjustment towards at least one fixed gear ratio, and comprising an electronic control unit which has a functional module such that, during the gear ratio adjustment between the engagement of a shift element of the (new) fixed gear ratio and the loading of the shift element of the (new) fixed gear ratio in order to control the internal combustion engine and the electric machine, a torque curve of the following type can be predefined:

the shift element to be engaged is loaded with a predefined torque gradient at a first point in time at which at least one tooth-on-tooth position can be assumed, up to a second point in time, during a predefined waiting period, the predefined torque is limited to a maximum permissible torque from the second point in time up to a third point in time, and after the waiting period or when the engaged state is detected, the shift element to be engaged is further loaded with the previously defined torque gradient—preferably until the torque in the fully loaded fixed gear is reached.

For example, the engagement of a single fixed gear starting from the power split gear ratio (E-CVT) is also relevant.

In particular, the invention relates to a motor vehicle comprising an internal combustion engine, comprising at least one electric machine, comprising an automatic gearbox having at least two fixed gear ratios and a variator for gear ratio adjustment between the two fixed gear ratios, wherein the variator comprises, for example, two electric machines. One electric machine may also suffice. In this case, the variator consists of the electric machine and a high-voltage battery.

The motor vehicle according to the invention further comprises an electronic control unit which is configured in such a way that a method for the reliable engagement of interlocking shift elements can be carried out during a gear change in DHT gearboxes.

The application is based on the following considerations:

The use of interlocking shift elements in DHT drives is motivated by the minimization of drag and actuation losses in the gearbox.

Interlocking shift elements, however, have the disadvantage that they can only establish interlocking in small angular ranges via the rotation of their two coupling elements. This means that a so-called tooth-on-tooth position exists over the remaining angular range of rotation.

As a rule, attempts are being made to minimize this disadvantage by means of geometric design of the coupling elements. Geometries in the form of pointed teeth or roof angles are used as examples. The rotation of the two coupling elements relative to each other is ensured here by the force of the actuator.

However, the geometric solution still involves the problem of tooth-on-tooth positioning to a certain extent and also entails the disadvantage of larger actuation paths.

However, reliable engagement is necessary to avoid excessive differential speeds due to delayed engagement of the shift element. The reason for this is the torque impulse generated during engagement, which increases in proportion to the differential speed to be reduced and leads to comfort problems or material damage if gear- and shift-element-dependent limit values are exceeded.

According to the invention, a functional solution is therefore proposed which preferably allows the engagement or closing of interlocking shift elements with blunt, but also with any type of interlocking shift elements.

Due to the actuating force of the actuator of the shift element, a frictional force and thus also a frictional torque act in the tooth-on-tooth position, thus preventing the two coupling elements from twisting. In contrast to conventional gearboxes, this frictional torque can be selectively overridden in the DHT.

By controlling the internal combustion engine and the electric machine in such a way that the torque to be transmitted to the shift element to be engaged is just slightly higher than the frictional torque, the coupling elements are rotated and the shift element can engage or close.

The difference between the torque to be transmitted and the effective frictional torque must not exceed a value dependent on the gear to be engaged, both for reasons of comfort and to prevent material damage.

In order to be able to run through the engagement process in a controlled manner from the tooth-on-tooth position, it is suggested to start loading the shift element to be engaged already in the tooth-on-tooth position. This builds up torque which will override the frictional torque.

In order to limit the difference between the torque to be transmitted and the acting frictional torque, the torque build-up at the shift element is stopped or at least slowed down from a value to be parameterized or applied, so that a rotation and ultimately an engagement of the shift element will take place below a torque level and differential speed level to be applied at the shift element.

After a period of time to be applied or when the engaged condition is detected, the original torque build-up is continued at the shift element which is now fully engaged.

In order to minimize the frictional torque generated by the actuator or to reduce it from the static friction value to the dynamic friction value, the shift element actuator is preferably operated in pulsed mode.

The frequency of the pulsation is preferably to be applied or parameterized here in such a way that the actuator force continues to reach its required value on average, but drops to 70% or 50% or 30% or possibly also 0% of the required value in the minimum of its course.

The invention is presented below by means of the drawings.

DETAILED DESCRIPTION

Figure 1:
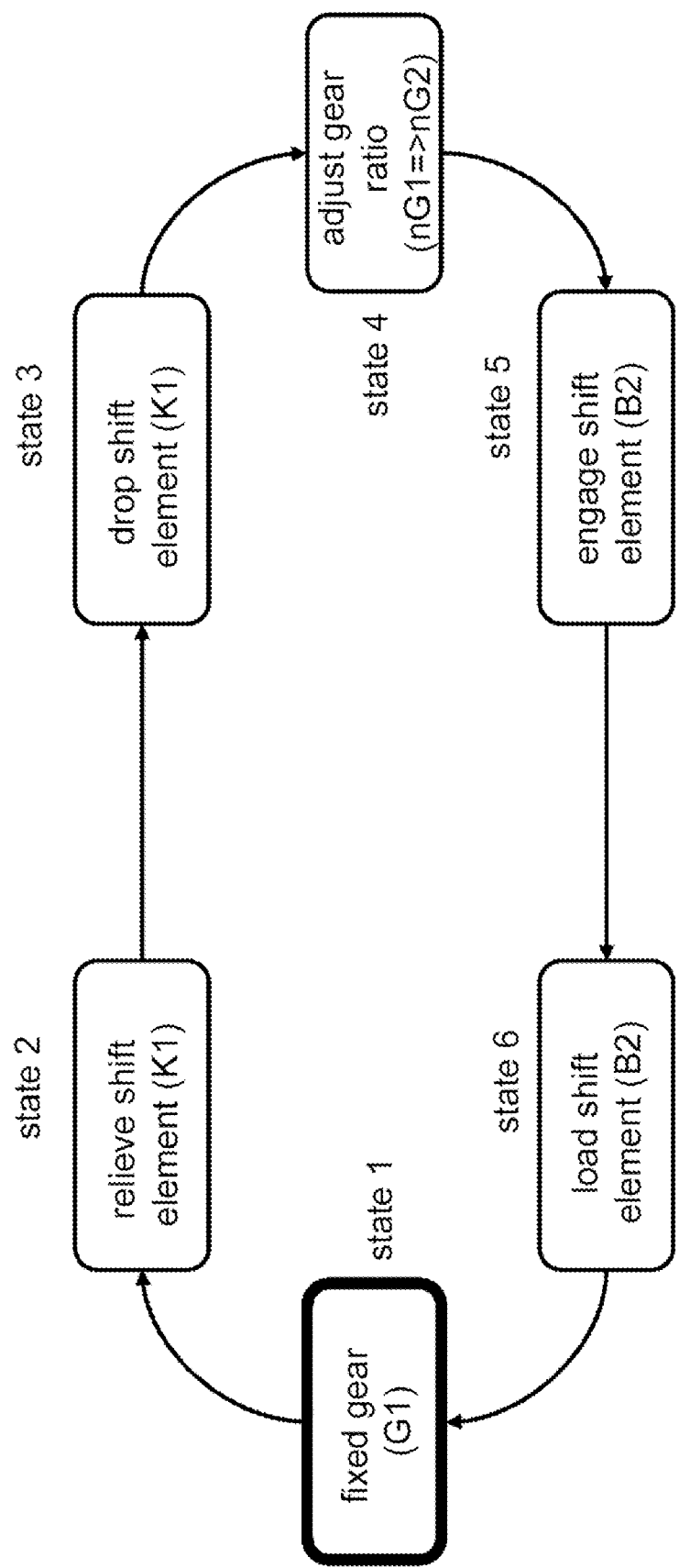
FIG. 1 shows state 1 of the entire shift sequence during a gear change with the automatic gearbox according to the invention from a first fixed gear to a second fixed gear, FIG. 2 schematically shows the essential components of a motor vehicle or gearbox according to the invention and their states in state 1 of the entire shift sequence.

FIG. 1 shows the initial state, state 1, with the first gear engaged (fixed gear G1) before a gear change command. This is followed by a gear change command in an electronic control unit SG by a corresponding input signal.

Figure 2:
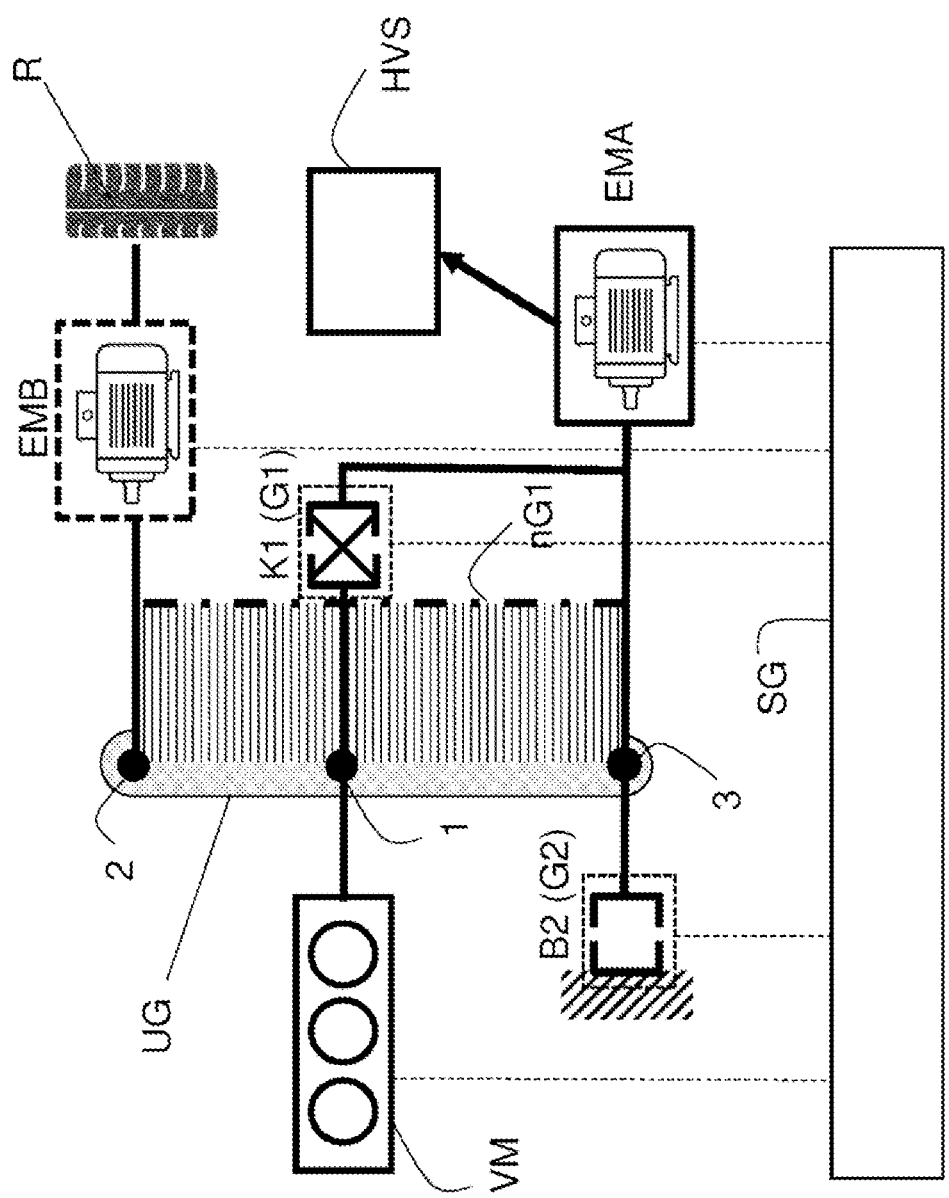

FIG. 2 shows the most important components of the present disclosure, which also apply for FIGS. 4, 6, 8, 10 and 12:

FIG. 2 schematically shows a hybrid vehicle that has a DHT automatic gearbox, an internal combustion engine VM, a first electric machine EMA, a second electric machine EMB, a high-voltage battery HVS, and an electronic control unit SG.

The automatic gearbox comprises an epicyclic gearing UG in the form of a power-splitting planetary gearing, a variator comprising the two electric machines EMA and EMB, and a first shift element K1 provided for engaging a first fixed gear ratio G1 (hereinafter also referred to as fixed gear G1) and a second shift element B2 provided for engaging a second fixed gear ratio G2.

The number of two translation levels here is only for better illustration; in practice, a higher number of translation levels can also be used.

Furthermore, the automatic gearbox comprises two gearbox shafts, namely an input shaft in the form of a drive shaft by means of which the automatic gearbox is coupled to the internal combustion engine VM in a torque-transmitting manner, and an output shaft in the form of a driven shaft by means of which the automatic gearbox is coupled to the wheels R of the motor vehicle in a torque-transmitting manner.

The automatic gearbox can also have three or more fixed gear ratios, in which case it would also have a correspondingly greater number of shift elements provided for engaging further gear ratios. Individual shift elements can also be provided for several gear ratios and/or a combination of several shift elements for one gear ratio.

The planetary gearing UG comprises the carrier 1, the ring gear 2, and the sun 3. The planetary gearing UG is coupled to both the input shaft and the output shaft in a torque-transmitting manner. Furthermore, the epicyclic gearing UG comprises a shaft via which it can be coupled to the input shaft in a torque-transmitting manner by means of the first shift element K1, which here forms a clutch, and can be coupled to the second shift element B2, which here forms a brake, in a torque-transmitting manner. The shaft has a speed-setting effect here on the internal combustion engine VM. In an alternative embodiment, the shift elements K1, B2 can be provided for any torque-transmitting functions.

The shift elements K1, B2 are each configured as dog clutches. This means that they are interlocking shift elements and require only a small amount of pressure to be held in the closed position. In an alternative embodiment, the shift elements K1, B2 can be any other suitable shift elements, for example frictionally engaging shift elements.

The variator functionality for gear ratio adjustment is provided by operating the first electric machine EMA as a generator and the second electric machine EMB as a motor. This allows kinetic energy and electrical energy to be converted into one another and thus allows the speeds of the two electric machines EMA, EMB to be decoupled from one another.

Shifting the automatic gearbox from a first gear ratio (fixed gear) G1 to a second fixed gear ratio (fixed gear) G2 is performed in accordance with the shift sequence illustrated with reference to FIGS. 3, 5, 7, 9 11 and 13.

According to FIGS. 1 and 2, the first fixed gear ratio G1 is engaged, that is to say, the first shift element K1 is closed and the second shift element B2 is open. Furthermore, the variator is decoupled; i.e., the electric machines are not coupled to either the input shaft or the output shaft in a torque-transmitting manner. All speeds nG1 are the same. The first electric machine EMA can be operated as a generator to charge the high-voltage battery HVS.

Figure 3:
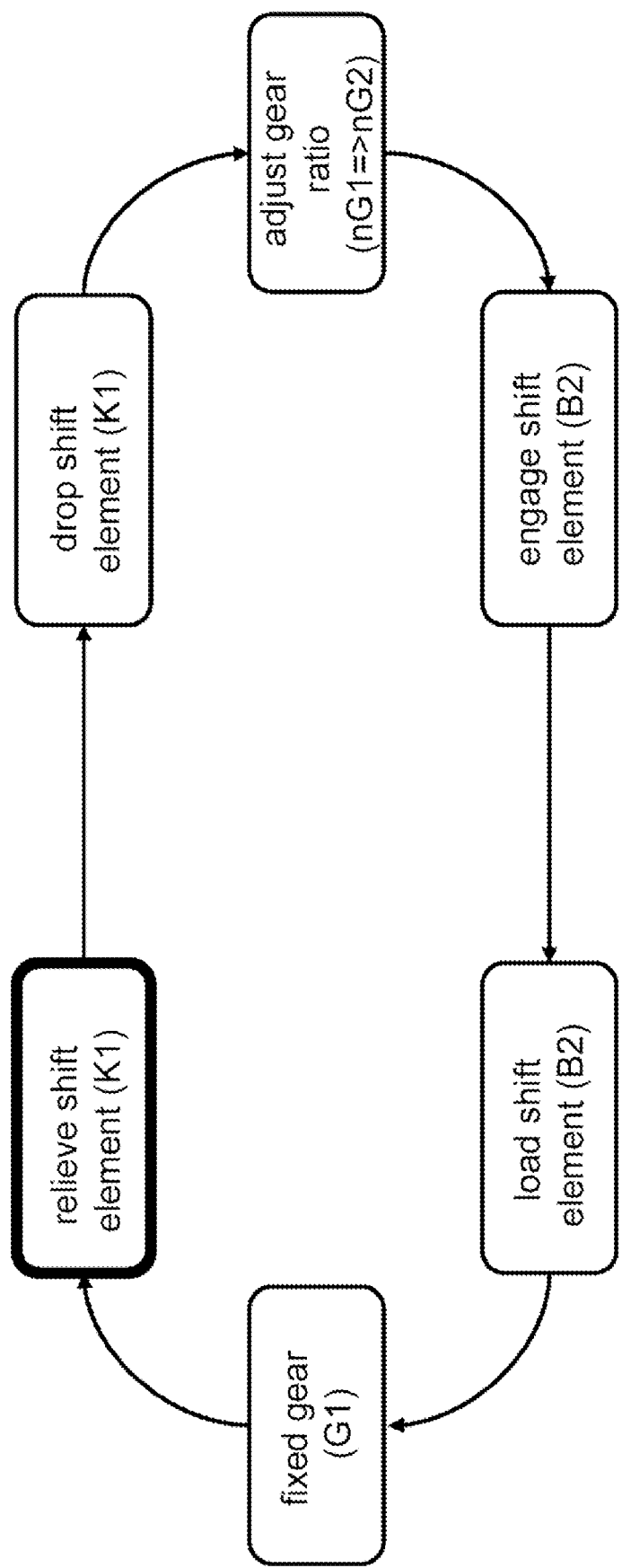
FIG. 3 shows state 2 of the entire shift sequence during a gear change with the automatic gearbox according to the invention from a first fixed gear to a second fixed gear, FIG. 4 schematically shows the essential components of a motor vehicle or gearbox according to the invention and their states in state 2 of the entire shift sequence.

To switch to the second fixed gear ratio G2, the shift element K1 of the current (old) fixed ratio G1 is now relieved, as shown in FIG. 3.

Figure 4:
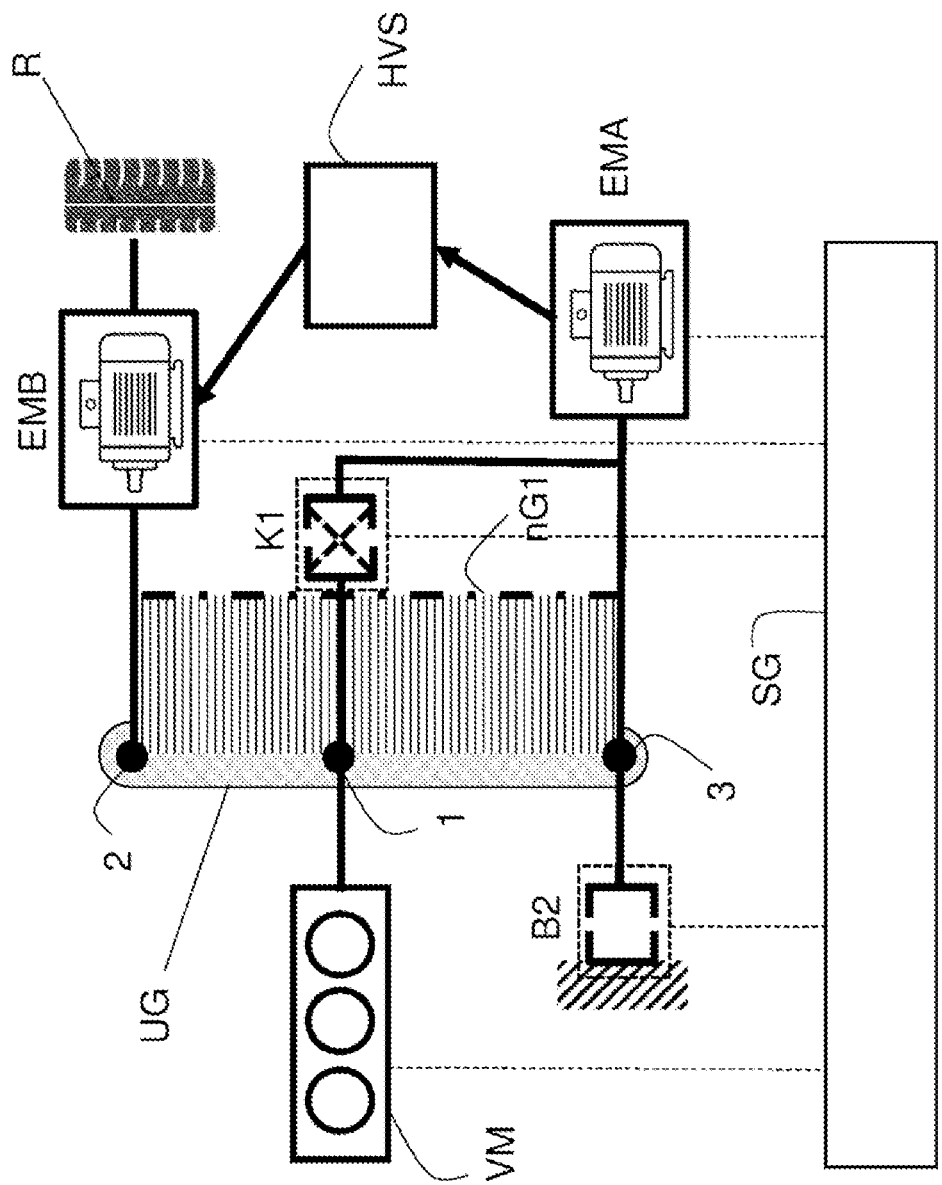

As can be seen in FIG. 4, the variator is coupled to the output shaft in a torque-transmitting manner and is also coupled to the epicyclic gearing UG via the shaft in a torque-transmitting manner. In other words, the second electric machine EMB is operated as a motor with the output or with the ring gear 2 or with the wheels R and is fed by the high-voltage battery HVS. The internal combustion engine VM can be switched off.

By means of the variator, the first shift element K1 is now relieved via the output shaft by a torque superposition (K1 shown dashed).

At this point, the essence of the present disclosure begins, which will be explained again with reference to FIGS. 13 and 14.

Figure 5:
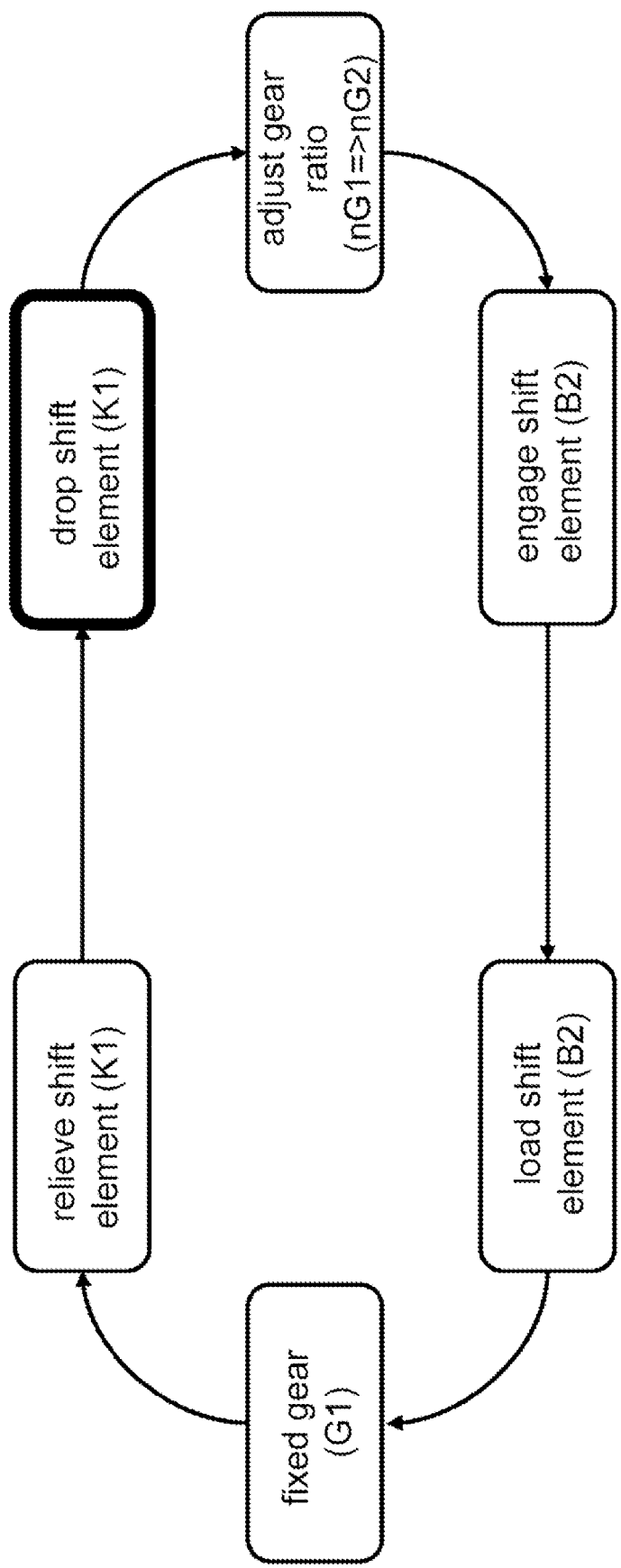
FIG. 5 shows state 3 of the entire shift sequence during a gear change with the automatic gearbox according to the invention from a first fixed gear to a second fixed gear, FIG. 6 schematically shows the essential components of a motor vehicle or gearbox according to the invention and their states in state 3 of the entire shift sequence.
Figure 6:
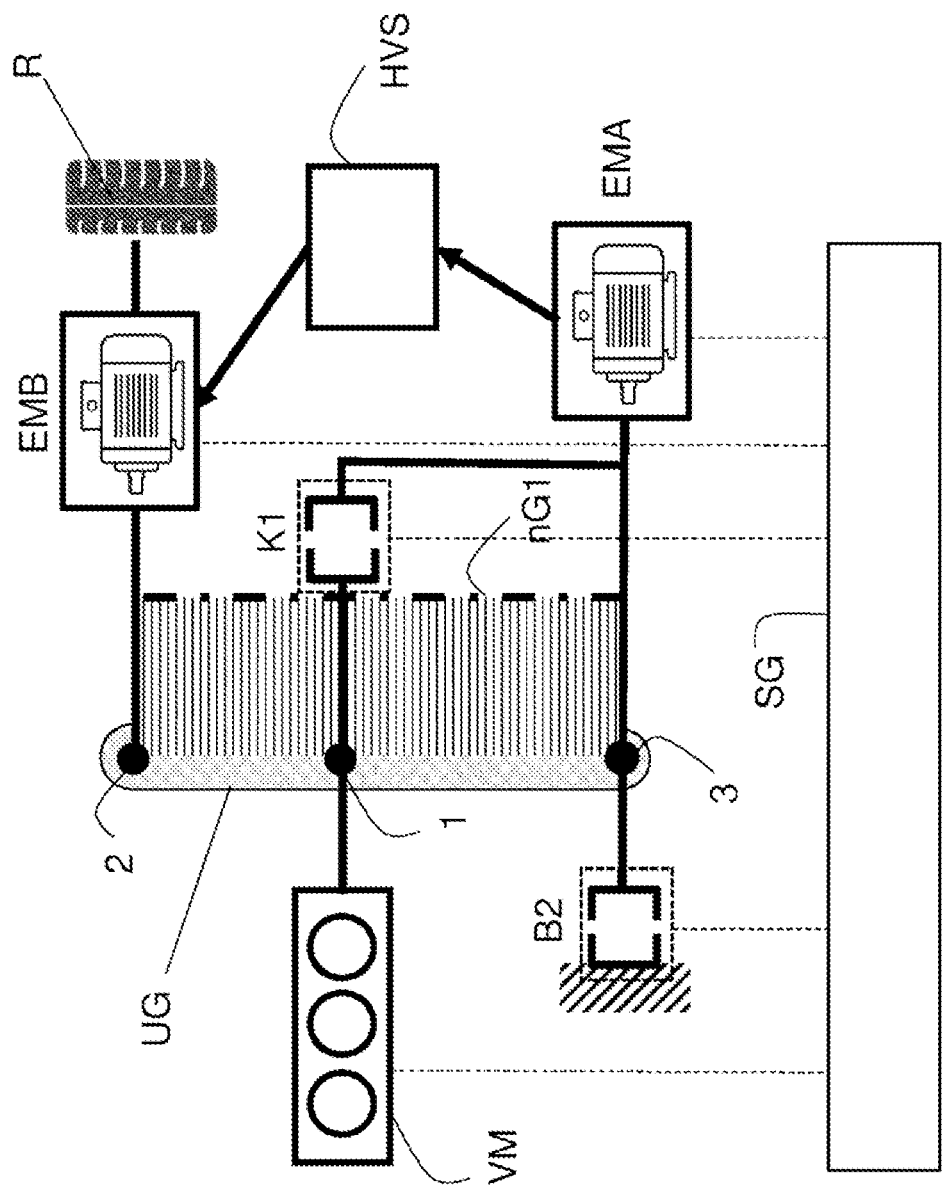

According to state 3, which is shown activated in FIG. 5, the shift element K1 is then disengaged, as shown in FIG. 6 with K1 open.

Figure 7:
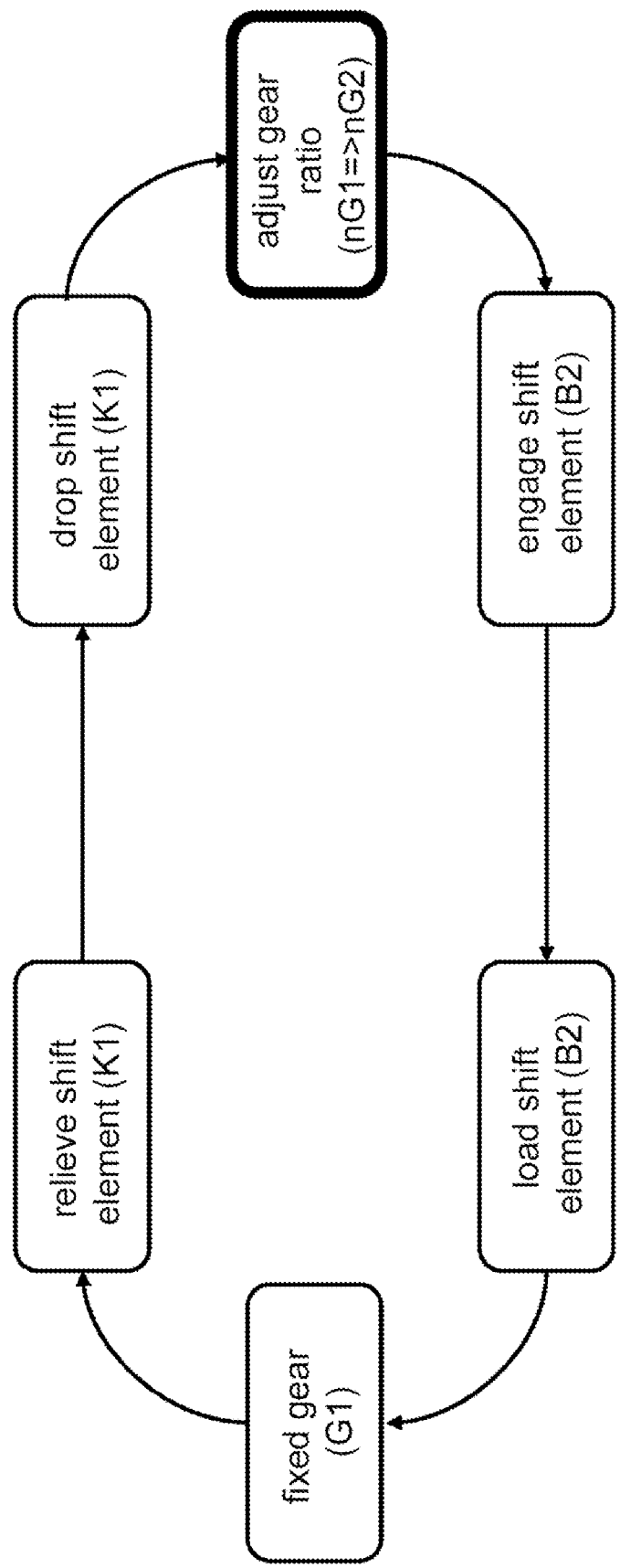
FIG. 7 shows state 4 of the entire shift sequence during a gear change with the automatic gearbox according to the invention from a first fixed gear to a second fixed gear, FIG. 8 schematically shows the essential components of a motor vehicle or gearbox according to the invention and their states in state 4 of the entire shift sequence.
Figure 8:
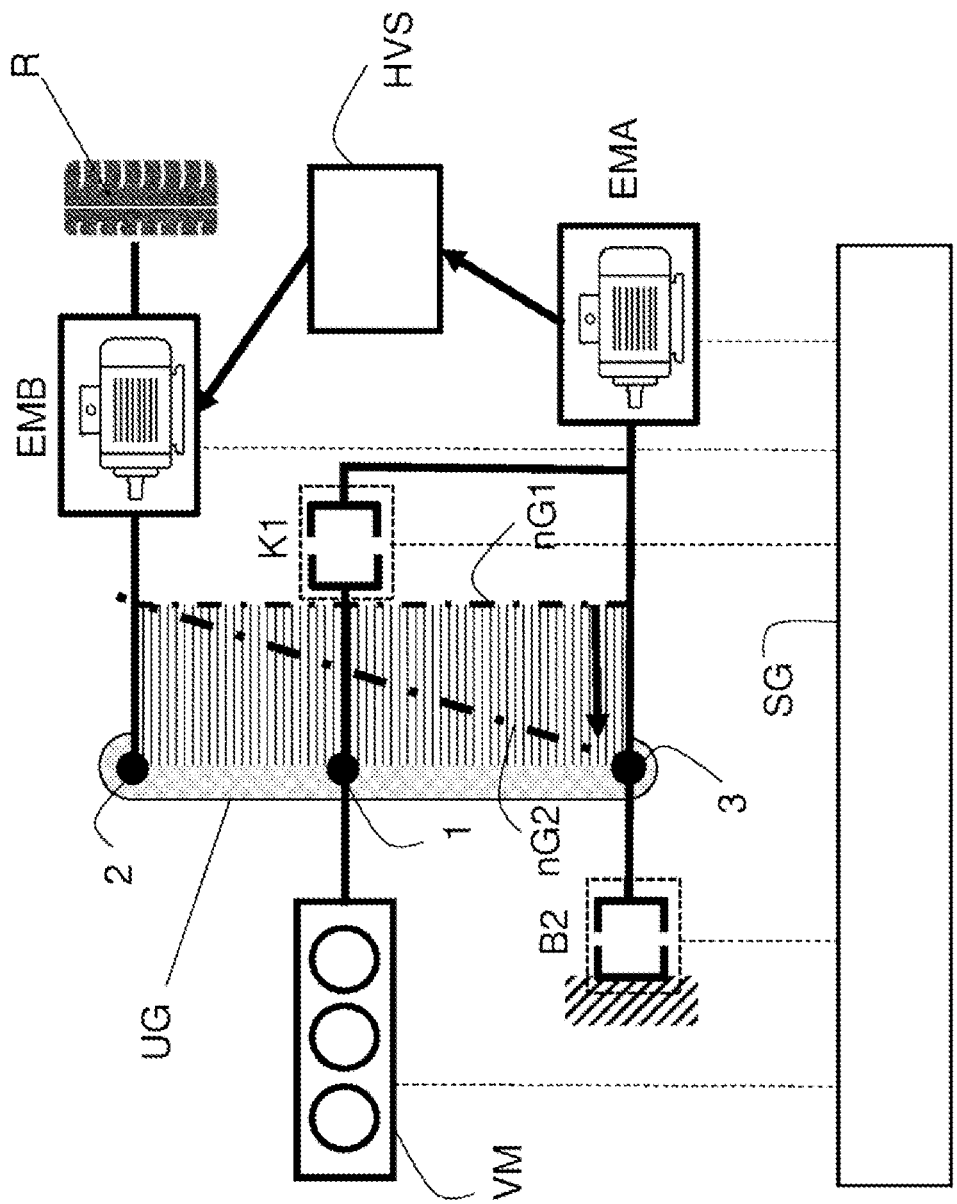

This is followed by state 4 according to FIG. 7, namely the preferably electrical and continuous gear ratio adjustment in a power-split gear ratio (E-CVT). This is illustrated in FIG. 8 by means of the speed shift at the sun 3. Accordingly, after opening the first shift element K1, the gear ratio of the second gear ratio (fixed gear) G2 is set by a continuous gear ratio adjustment of the variator or the electric machine EMA. The brake B2 is still open here.

This means that a 3-shaft operation is established, whereby the differential speed at the second shift element B2 is reduced.

Figure 9:
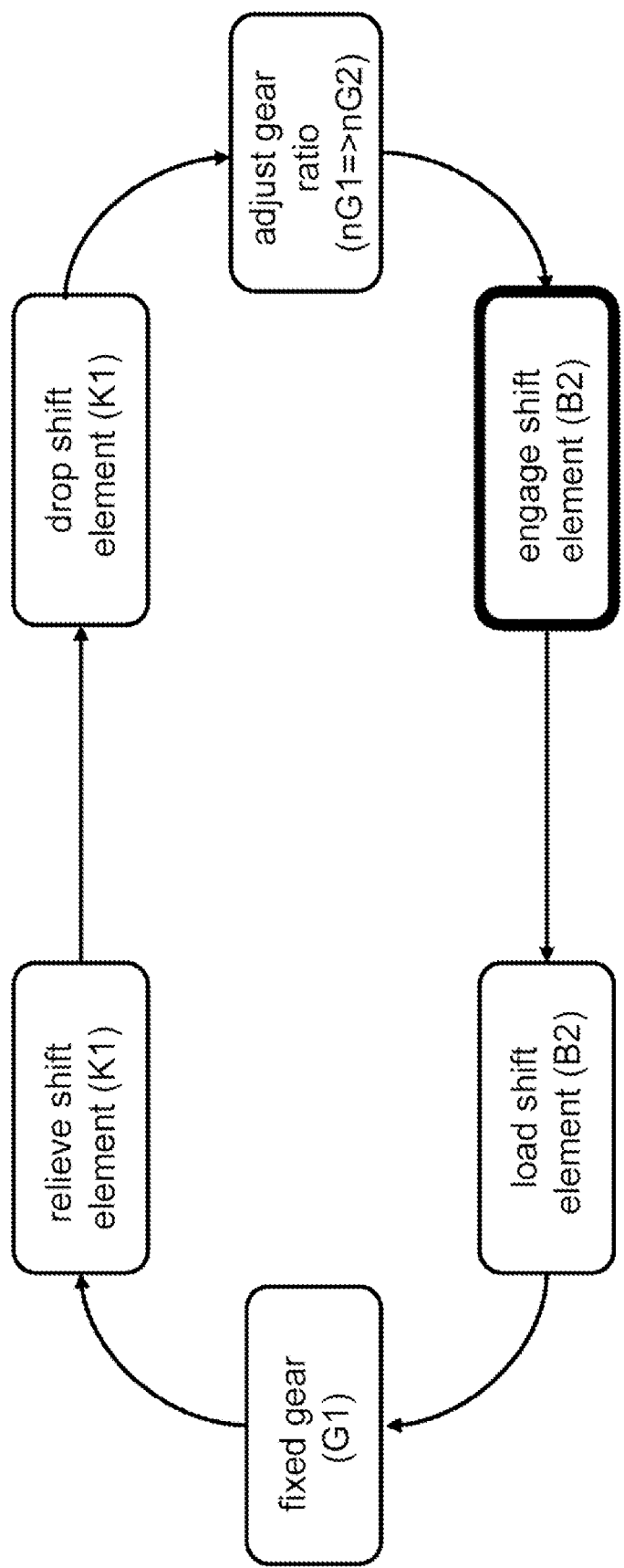
FIG. 9 shows state 5 of the entire shift sequence during a gear change with the automatic gearbox according to the invention from a first fixed gear to a second fixed gear, FIG. 10 schematically shows the essential components of a motor vehicle or gearbox according to the invention and their states in state 5 of the entire shift sequence.

FIG. 9 shows the state 5 in which the shift element B2 is closed for the new fixed gear G2.

Figure 10:
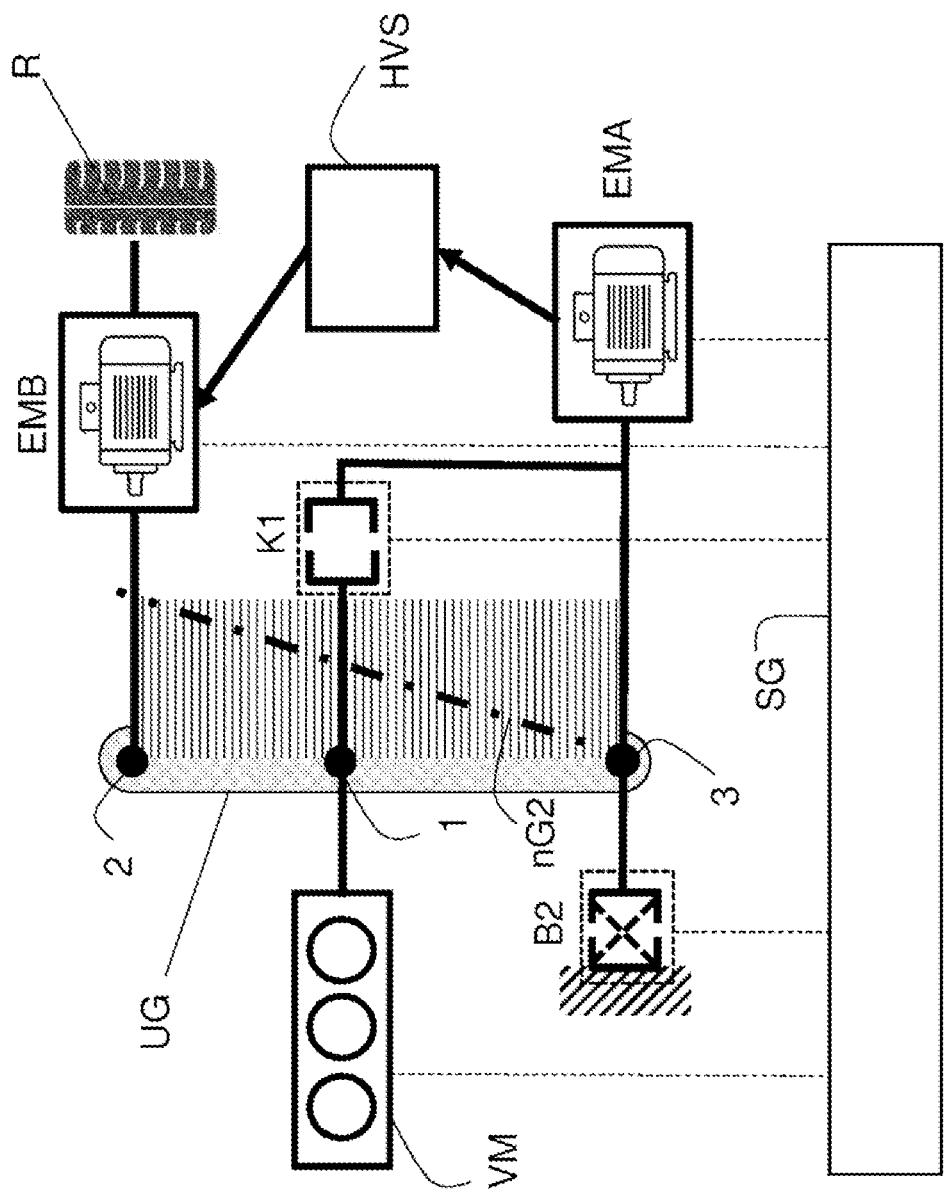

It can be seen here in FIG. 10 that the second shift element B2 is closed as soon as the differential speed has been reduced to zero or has fallen below a certain limit value. This causes the second shift element B2 to take over the load from the variator, and the variator can be decoupled (see FIG. 10, dashed electric machine EMB). The brake B2 is not yet loaded (dashed B2).

Figure 11:
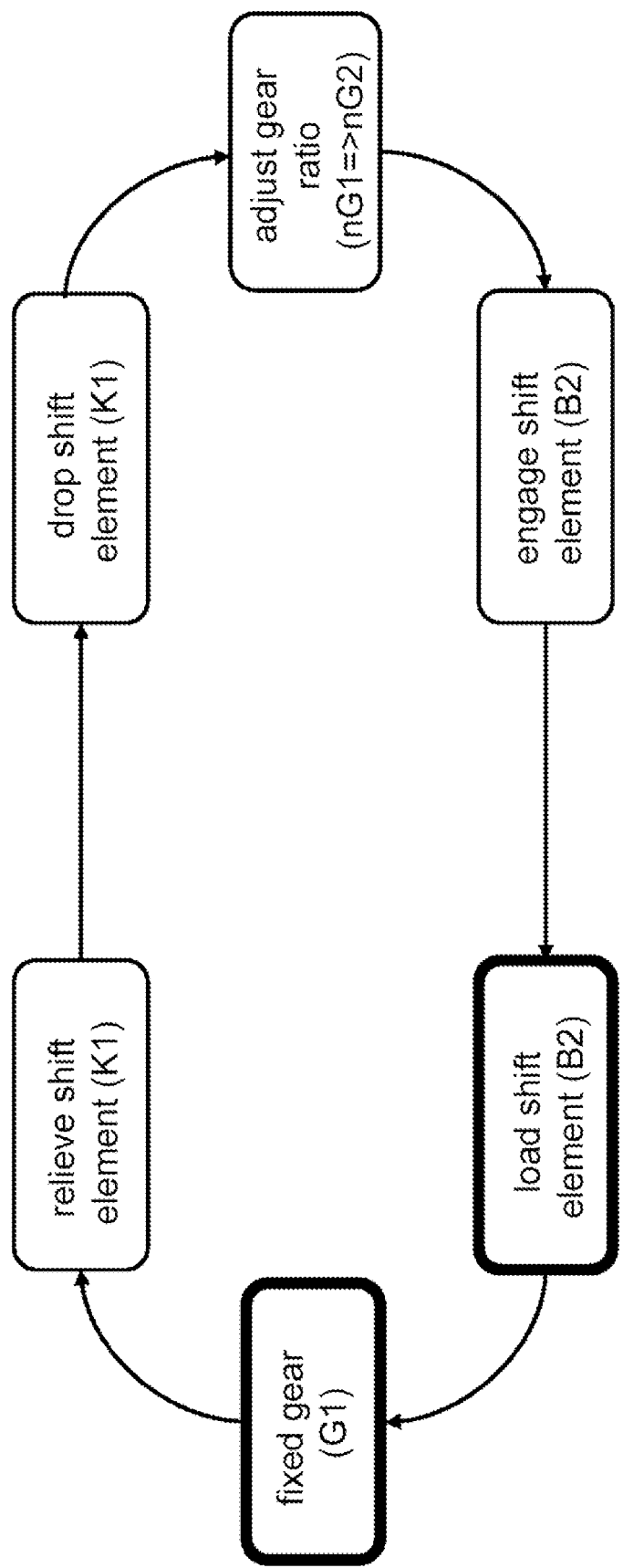
FIG. 11 shows states 6 and 7 of the entire shift sequence during a gear change with the automatic gearbox according to the invention from a first fixed gear to a second fixed gear, FIG. 12 schematically shows the essential components of a motor vehicle or gearbox according to the invention and their states at state 6 and 7 of the entire shift sequence.
Figure 12:
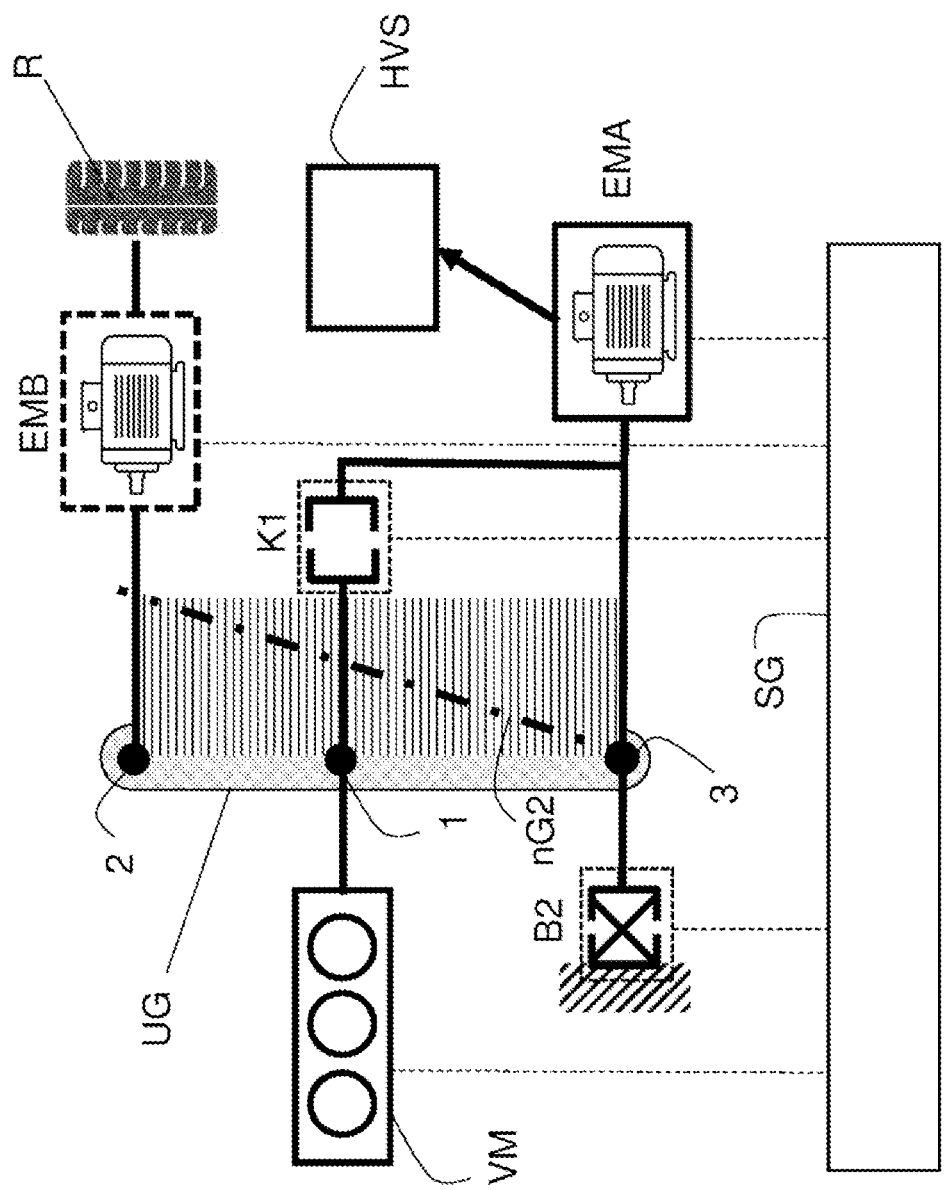

In FIG. 11, state 6 and, directly associated therewith, state 7 or 1 again is reached, in which the new shift element B2 can be loaded (completely closed B2 in FIG. 12). With FIG. 12 the shift sequence of a gear change is finished.

Figure 13:
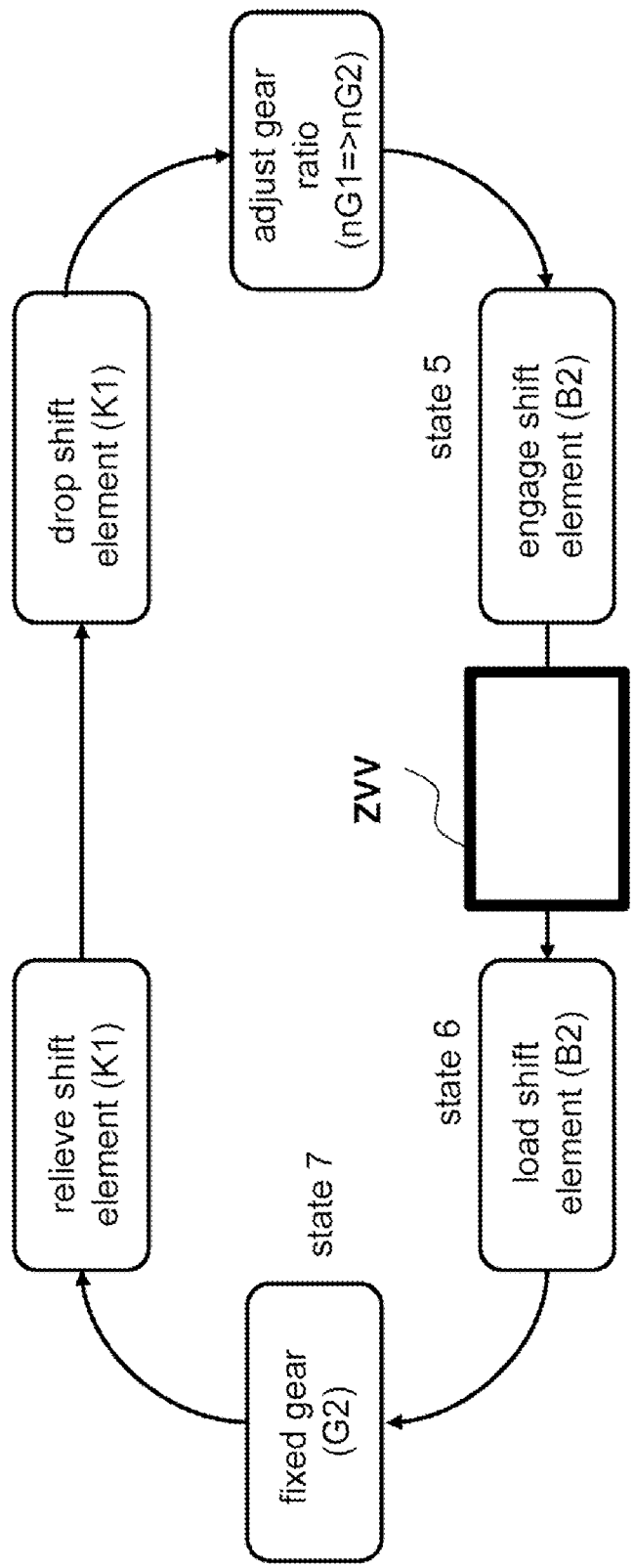
FIG. 13 shows the essential intermediate step according to the invention between states 5 and 6 of the entire shift sequence during a gear change with the automatic gearbox according to the invention from a first fixed gear to a second fixed gear.
Figure 14:
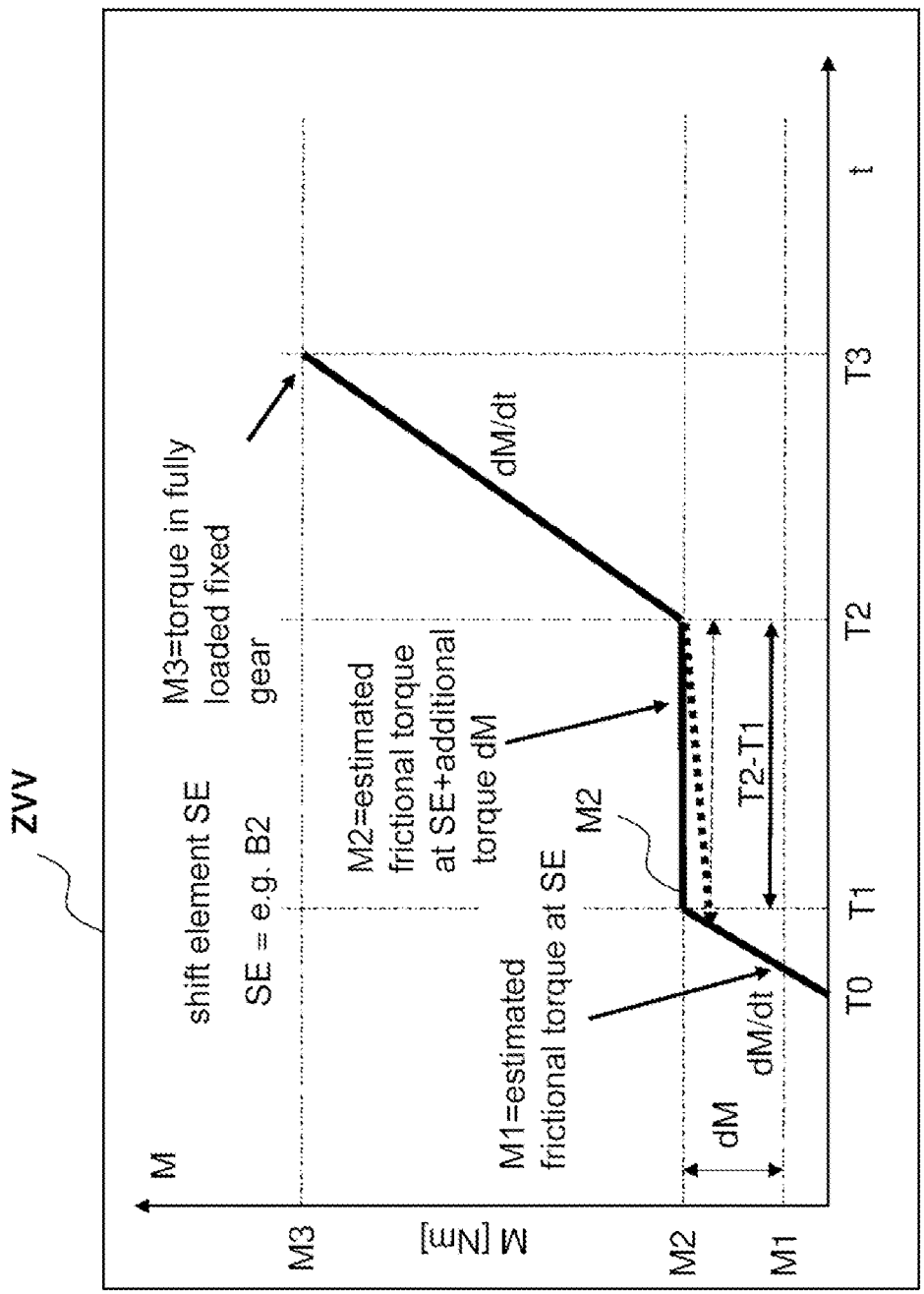
FIG. 14 shows schematically the torque curve resulting from the invention at the shift element concerned.

In FIG. 13, the intermediate state between state 5 and 6 according to the present disclosure is shown by a functional module ZW (tooth twisting prevention) in the control unit SG or by a process executed by the control unit SG, the effect of which on the course of the torque M at the shift element SE (here B2) is shown in FIG. 14 over time t:

The following is an exemplary embodiment with the resulting torque curve M according to FIG. 14:

An actuating force of 200 N for example acts on an interlocking shift element SE (for example B2) in tooth-on-tooth position, which has an effective radius of 100 mm, for example. The assumed coefficient of friction is 0.15, for example. This results in an estimated frictional torque M1 of 3 Nm to be overridden. Due to the effective mass moment of inertia (J), the ratio of the differential speed gradient to the effective torque (M−M1) is 10 rad/Nms$^2$. In the worst case, the shift element SE must turn 28° in order to engage, but must not engage with more than 10 rad/s differential speed.

This results accordingly in the time span T2−T1 in FIG. 14 (t=2·Δφ/Δω)) with 0.1 s (waiting period) and an angular acceleration of 100 rad/s$^2$. The ratio of the differential speed gradient to the effective torque (M−M1) results in a maximum permissible additional torque dM of 10 Nm. This means that 3 Nm+10 Nm=13 Nm (M1+dM=M2) must not be exceeded at the shift element SE. Thus, a reduced torque plateau M2 of M1+dM, here 13 Nm, is defined over a waiting period of T2−T1, here 0.1 s. Before the waiting period T2−T1 is reached and after it has elapsed, the originally required torque gradient dM/dt is converted at the shift element SE: predefined torque gradient dM/dt from T0 to T1 and from T2 to T3. T0 is the time here from which it can be assumed that the actuator of the shift element SE has moved the shift element SE at least into the tooth-on-tooth position, ideally of course into the engagement range. Only from T0 onwards may the interlocking shift element SE (here B2) to be newly engaged be loaded with torque M in accordance with the proposed functional sequence in order to avoid damage or discomfort. The torque gradient dM/dt from T2 to T3 is defined until the torque M3 is reached in the fully loaded fixed gear—here G2.

If the torque is not to be kept constant in the time range from T1 to T2, but is to be increased slightly, it still applies that the 13 Nm must not be exceeded, but the duration for reliable engagement will increase, since the required rotation angle must still be achieved (see dashed lines in FIG. 14).

FIG. 14 thus shows an example of an engagement process of a shift element SE in conjunction with the control of internal combustion engine VM and/or electric motor generator EMA in a DHT for reliable engagement of the shift element SE, also from a possible tooth-on-tooth position.

The following is a summary of the entire shift sequence with the intermediate state according to the present disclosure starting from the current fixed gear:
- relief of the old shift element K1 by the electric machines (state 2);
- activation of the functional module for speed adjustment DZA (generation of a load change at the shift element K1 to be opened and simultaneous control of the actuator to open the shift element K1);
- opening of the old shift element K1 (state 3) (change to an E-CVT mode);
- speed adjustment for ratio adjustment (nG1=>nG2) in the gearbox via the E-CVT mode (state 4);
- engagement of the new shift element (B2) (state 5);
- activation of the functional module ZW according to the present disclosure in the control unit SG for carrying out a method for the reliable engagement of interlocking shift elements SE (here B2);
- loading the new shift element (B2) (state 6); and
- "dropping" of the electric machines EMA and EMB (state 7=state 1)=>new fixed gear G2.

The following is a summary of a method carried out by means of the functional module ZW according to the present disclosure:
- an application of torque (M) to the shift element (SE; B2) to be engaged begins at a time (T0) at which at least a tooth-on-tooth position can be assumed (by chance, the gear could also already be engaged), with a predefined torque gradient (dM/dt);
- in particular depending on the effective radius, on an assumed friction value and on the available actuating force of the actuator of a shift element (SE), a frictional torque (M1) to be overridden is estimated;
- in particular depending on the effective mass moment of inertia, on a maximum rotational angle and on a maximum defined differential speed gradient, a defined waiting period (T2−T1) is determined;
- during the waiting period (T2−T1), a maximum permissible torque (M1) is defined which is determined from the estimated frictional torque (M1) to be overridden and an additional torque (dM);
- the additional torque (dM) is determined in particular from the ratio of the establishing differential speed gradient to the effective torque (M−M1) or on the basis of the effective mass moment of inertia (J) in relation to the shift element to be engaged; and
- after the waiting period (T2−T1) (or if the gear has already been engaged without tooth-on-tooth position), the defined torque gradient (dM/dt) is again defined for torque control until the fully loaded torque (M2) is reached (at time T3) in the new fixed gear (here G2).

The invention claimed is:

1. A motor vehicle comprising:
at least two drive motors, wherein at least one drive motor is an electric machine;
a high-voltage battery;
an automatic gearbox comprising:
  at least one fixed gear ratio and at least one power-split gear ratio (E-CVT); and/or
  at least one serial gear ratio for gear ratio adjustment towards the at least one fixed gear ratio; and
an electronic control unit configured to, during a ratio adjustment between an engagement of a shift element and a loading of the shift element, in order to control an internal combustion engine and the electric machine:
  cause the shift element to be loaded with a predefined torque gradient at a first point in time at which at least one tooth-on-tooth position exists up to a second point in time;
  cause the predefined torque to be limited to a maximum permissible torque during a predefined waiting period from the second point in time up to a third point in time; and
  cause the shift element to be further loaded with the previously defined torque gradient after the waiting period or when an engaged state is detected.

2. The motor vehicle according to claim 1, wherein the electronic control unit is configured to:
control the torque in a pulsed manner during the predefined waiting period.

3. The motor vehicle according to claim 1, wherein the maximum permissible torque is determined from an estimated frictional torque to be overridden and an additional torque.

4. The motor vehicle according to claim 3, wherein the estimated frictional torque to be overridden is estimated based on an effective radius, an assumed friction value, and an available actuating force of a shift element actuator of the shift element.

5. The motor vehicle according to claim 3, wherein the additional torque is determined based on a predefined maximum permissible shift element differential speed and an effective mass moment of inertia.

6. The motor vehicle according to claim 1, wherein the predefined waiting period is determined based on an effective mass moment of inertia, a maximum rotational angle, and a maximum defined differential speed gradient.

7. The motor vehicle according to claim 1, wherein the automatic gearbox comprises:
an epicyclic gearing;
the shift element; and
actuators configured to be actuated by the electronic control unit;
wherein the at least one electric machine is part of a variator.

8. An electronic control unit for a motor vehicle or an automatic gearbox, the electronic control unit configured to:
during a ratio adjustment between an engagement of a shift element and a loading of the shift element:
  cause the shift element to be loaded with a predefined torque gradient at a first point in time at which at least one tooth-on-tooth position exists up to a second point in time;

cause the predefined torque to be limited to a maximum permissible torque during a predefined waiting period from the second point in time up to a third point in time; and causing the shift element to be further loaded with the previously defined torque gradient after the waiting period or when an engaged state is detected.

9. The electronic control unit according to claim 8, further configured to:

control the torque in a pulsed manner during the predefined waiting period.

10. The electronic control unit according to claim 8, wherein the maximum permissible torque is determined from an estimated frictional torque to be overridden and an additional torque.

11. The electronic control unit according to claim 10, wherein the estimated frictional torque to be overridden is estimated based on an effective radius, an assumed friction value, and an available actuating force of a shift element actuator of the shift element.

12. The electronic control unit according to claim 10, wherein the additional torque is determined based on a predefined maximum permissible shift element differential speed and an effective mass moment of inertia.

13. The electronic control unit according to claim 8, wherein the predefined waiting period is determined based on an effective mass moment of inertia, a maximum rotational angle, and a maximum defined differential speed gradient.

14. A method for shifting an automatic gearbox in a motor vehicle, the method comprising:

during a gear ratio adjustment between an engagement of a shift element and a loading of the shift element, in order to control an internal combustion engine and an electric machine:

loading the shift element with a predefined torque gradient at a first point in time at which at least one tooth-on-tooth position exists, up to a second point in time;

limiting the predefined torque to a maximum permissible torque during a predefined waiting period from the second point in time up to a third point in time; and further loading the shift element with the previously defined torque gradient after the waiting period or when an engaged state is detected.

15. The method according to claim 14, further comprising:

controlling the torque in a pulsed manner during the predefined waiting period.

16. The method according to claim 14, wherein the maximum permissible torque is determined from an estimated frictional torque to be overridden and an additional torque.

17. The method according to claim 16, wherein the estimated frictional torque to be overridden is estimated based on an effective radius, an assumed friction value, and an available actuating force of a shift element actuator of the shift element.

18. The method according to claim 16, wherein the additional torque is determined based on a predefined maximum permissible shift element differential speed and an effective mass moment of inertia.

19. The method according to claim 14, wherein the predefined waiting period is determined based on an effective mass moment of inertia, a maximum rotational angle, and a maximum defined differential speed gradient.

20. The method according to claim 14, further comprising:

controlling the at least one electric machine as part of a variator.

* * * * *